C. H. FRINK.
ART OF INTRODUCTION AND RETENTION OF DENTAL FILLING MATERIALS.
APPLICATION FILED JUNE 22, 1908.
1,151,352. Patented Aug. 24, 1915.
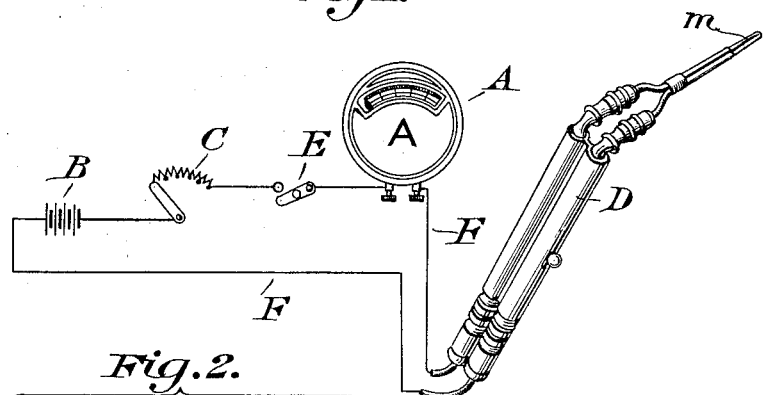
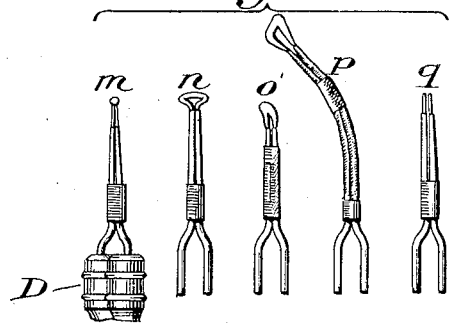
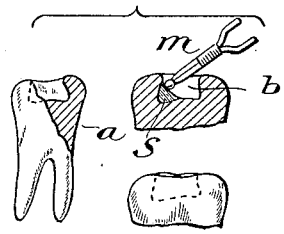
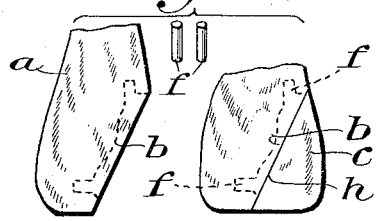
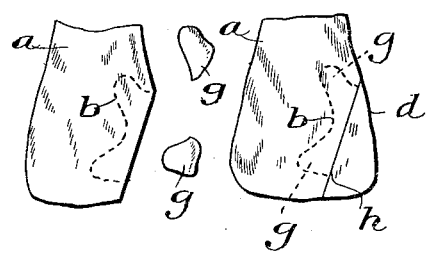
Inventor
Carroll H. Frink
By Victor J. Evans
Attorney
Witnesses

UNITED STATES PATENT OFFICE.

CARROLL H. FRINK, OF JACKSONVILLE, FLORIDA.

ART OF INTRODUCTION AND RETENTION OF DENTAL FILLING MATERIALS.

1,151,352.  Specification of Letters Patent.  Patented Aug. 24, 1915.

Application filed June 22, 1908. Serial No. 439,840.

*To all whom it may concern:*

Be it known that I, CARROLL HATELEY FRINK, a citizen of the United States, residing at Jacksonville, in the county of Duval and State of Florida, have invented certain new and useful Improvements in the Art of Introduction and Retention of Dental Filling Materials, of which the following is a specification.

This invention relates to the art of filling human teeth with porcelain bodies, metals, dental cement and other materials known to dental science in a manner having for its object a more expeditious and less painful procedure than by means ordinarily practised, and also a more permanent and lasting adaptation of the filling material to the tooth tissues or to a basic filling previously introduced.

The introduction and retention of tooth filling substances and materials have heretofore been effected by the adhesive properties of the material, as in the case of cement; the introduction in a plastic state of material afterward becoming hard, as in the case of dental amalgam; by hand pressure or by malleting, as in the case of gold; or by the finished filling, whether of porcelain, metal or other material, being cemented or otherwise retained in the tooth cavity after being molded or cast prior to its insertion. Instead of depending on any of the foregoing methods I fuse the filling material within the tooth cavity itself by a method which, as far as I am aware, is original and unique in the annals of dental science, the necessary heat being generated or produced within the tooth cavity itself.

With these and other objects in view my invention consists in the improvements which will be hereinafter shown and described and particularly pointed out in the claims.

In the accompanying drawing are shown various modifications of the improved methods as practised by me in the introduction of fusible dental filling materials, and means whereby the method may be carried into practical operation, and in said drawing,—

Figure 1 is a plan view showing a preferred arrangement of necessary instruments and appliances used in the method herein described. Fig. 2 shows enlarged perspective views of various forms of the burnisher. Fig. 3 is a view showing partly sectional elevations of human teeth illustrating one method of carrying the improved art into practical operation. Figs. 4 and 5 are detail views illustrating modifications.

Corresponding parts in the several figures are denoted by like characters of reference.

It may be remarked that on account of the nervous sensitiveness of the dental pulp and the structure of the tooth tissues no great amount of heat can be transmitted to them, hence the necessity of generating within the tooth cavity itself the heat necessary to fuse the filling material used. This I accomplish by the use of appliances as shown in Fig. 1, where A designates an ammeter; B, a battery constituting a source of electrical current supply; C, a rheostat; D, a burnisher equipped with a small platinum loop $m$; E, a switch; and F, F the conductors.

The ammeter A is provided with special scales, the upper registering the current in amperes and the other scales registering the degree of heat maintained in the electrical heated platinum burnishers D, one of which has been shown connected with the conductors F supplying the electrical energy from the source consisting of the battery B.

It may be further explained that the object of the ammeter A registering the temperature of the burnisher D is to make more certain the proper fusing of the various filling materials, the fusing points of which vary greatly, and as the resistance of the several burnishers D varies, different or individual scales are needed in the ammeter.

Fig. 2 shows in perspective an enlarged view of a portion of a burnisher having a very small platinum loop $m$ which becomes heated when the proper current passes through the same. Fig. 2 also shows duplicate instruments $n$, $o$, $p$, $q$ with platinum points which are varied to suit individual cases, and also in the case of the instrument $q$ a small arc is used instead of the platinum loop. The use of any of these instruments will be readily understood by reference to Fig. 3 which shows partly sectional views of a prepared cavity $b$ in a tooth $a$ and illustrates the procedure as already described, it being understood that the filling material $s$ is gradually introduced and locally fused to form a solid integral body until a filling of the requisite dimensions has been gradually built up. It is obvious that the cavity b, previous to the introduction of the filling material is to be cleaned and prepared in the usual manner.

Referring to Fig. 4 of the drawing, it will be seen that rods f, f of porcelain or other suitable material are provided, said rods being secured in previously drilled holes or retaining pits by a special cement, which latter must be of such a nature as not to be affected by the heat subsequently employed for the purpose of fusing. After the introduction of the rods f, f the balance of the cavity is filled with a fused porcelain body c of a proper color or tooth shade, said filling being gradually upbuilt by fusing upon the basic filling composed of the rods f, f.

Fig. 5 illustrates a tooth cavity for which it is deemed advisable to first fuse, out of the mouth, two adapted porcelain bodies or partial fillings g, g upon which, after said bodies have been secured in position by dental cement as in the manner of the rods f, f, I fuse the remaining material needed to build up the filling in the manner hereinafter described, thus engaging the basic filling g, g with the body of the filling shown at d and preventing the filling being dislodged except in case of accidental fracture either of the filling itself or of the tooth. The seams h are barely visible to the naked eye when the operation is delicately performed by those experienced in dental science. In order that the success of the operation may be more fully assured I further recommend that the porcelain rods f, f and the filling g, g be immersed in hydro-fluoric acid for a few minutes and afterward boiling the same in a strong solution of sodium bicarbonate prior to their insertion with dental cement. The hydro-fluoric acid etches or roughens the surface of the porcelain, and the solution of sodium bicarbonate removes every trace of acid, thereby preventing the action of minute quantities of acid after the rods or partial fillings are in position.

On account of atmospheric radiation the tooth becomes but little heated in the process of upbuilding the body of the filling upon the basic filling, said body being fused layer after layer and thus gradually built up. If metallic filling materials are used, a blast of cold air from the compressed air apparatus now in use is advisable during the operation.

From the foregoing description, taken in connection with the drawing hereto annexed, the operation and advantages of this invention will be readily understood. The fusing of the filling material occurs within a very small area and has been successfully carried out without discomfort to the patient. The filling introduced in accordance with my invention will be found thoroughly useful and permanent.

Having thus described the invention, what is claimed as new, is:—

1. The art of filling a tooth cavity which consists in introducing partial fillings and securing the same by dental cement, and subsequently upbuilding upon said partial fillings or bases a complete filling by fusing the material in the latter to the bases or partial fillings.

2. The art of filling a tooth cavity which consists in introducing fusible filling material and fusing the same within the cavity to form a coherent filling.

3. The art of filling a tooth cavity which consists in introducing filling material and fusing the same by heat generated within the cavity to form a coherent body.

4. The art of filling a tooth cavity which consists in introducing separate pieces of filling material and subsequently fusing together such pieces to form a coherent body.

5. The art of filling a tooth cavity which consists in upbuilding a filling within the cavity by fusing together fragmentary pieces to form a coherent body.

In testimony whereof I affix my signature in presence of two witnesses.

CARROLL H. FRINK.

Witnesses:
 EVERETT MIZELL,
 LUTHER READLICK.

Copies of this patent may be obtained for five cents each, by addressing the "Commissioner of Patents. Washington, D. C."